United States Patent
Gardner

(10) Patent No.: US 8,756,417 B1
(45) Date of Patent: Jun. 17, 2014

(54) MULTI-LEVEL ASSURANCE TRUSTED COMPUTING PLATFORM

(71) Applicant: Sypris Electronics LLC, Tampa, FL (US)

(72) Inventor: Douglas J. Gardner, Tampa, FL (US)

(73) Assignee: Sypris Electronics, LLC, Tampa, FL (US)

(*) Notice: Subject to any disclaimer, the term of this patent is extended or adjusted under 35 U.S.C. 154(b) by 0 days.

(21) Appl. No.: 14/172,474

(22) Filed: Feb. 4, 2014

(51) Int. Cl.
| | |
|---|---|
| G06F 21/00 | (2013.01) |
| G06F 21/10 | (2013.01) |
| G06F 21/60 | (2013.01) |
| G06F 21/74 | (2013.01) |
| G06F 21/62 | (2013.01) |
| G06F 21/53 | (2013.01) |
| G06F 21/57 | (2013.01) |

(52) U.S. Cl.
CPC ............... *G06F 21/57* (2013.01); *G06F 21/10* (2013.01); *G06F 21/606* (2013.01); *G06F 21/74* (2013.01); *G06F 21/6218* (2013.01); *G06F 21/53* (2013.01); *G06F 2221/2105* (2013.01)
USPC ........... 713/164; 713/166; 713/189; 713/190; 726/2; 726/26; 726/27; 380/262; 709/224

(58) Field of Classification Search
CPC ..... G06F 21/57; G06F 21/53; G06F 21/6218; G06F 21/74; G06F 21/10; G06F 21/606; G06F 2221/2105
USPC ........................................ 713/164
See application file for complete search history.

(56) References Cited

U.S. PATENT DOCUMENTS

| | | | |
|---|---|---|---|
| 7,194,634 B2 | 3/2007 | Ellison et al. | |
| 7,603,550 B2 | 10/2009 | McGrath et al. | |
| 7,603,551 B2 | 10/2009 | McGrath et al. | |
| 7,822,958 B1* | 10/2010 | Allen et al. ....................... | 713/1 |
| 8,117,642 B2 | 2/2012 | Covey et al. | |
| 8,433,902 B2 | 4/2013 | Donlin et al. | |
| 8,458,801 B2 | 6/2013 | Furusawa et al. | |
| 2007/0294745 A1 | 12/2007 | Tan et al. | |
| 2011/0023106 A1* | 1/2011 | Murotake et al. ............... | 726/11 |
| 2011/0154501 A1 | 6/2011 | Banginwar et al. | |
| 2011/0238967 A1* | 9/2011 | Challener et al. ................ | 713/1 |
| 2012/0216281 A1 | 8/2012 | Uner et al. | |
| 2013/0031374 A1* | 1/2013 | Thom et al. .................... | 713/189 |

OTHER PUBLICATIONS

Doug Gardner and Jonathan McCune, "Toward Trusted Embedded Systems," 2nd Annual NSA Trusted Computing Conference & Exposition, Sep. 20, 2011, Orlando, Florida.

* cited by examiner

*Primary Examiner* — Taghi Arani
*Assistant Examiner* — Narciso Victoria
(74) *Attorney, Agent, or Firm* — Law Office of Thomas J. Brindisi

(57) ABSTRACT

A multi-mode Trusted Computing Platform (TCP) comprising a Field Programmable Gate Array (FPGA) device that includes a Type-1-compliant root of trust (ROT), a memory containing a Type-1 security boot image and at least one lower-security boot image, and a memory containing a Type-1-associated operating system (OS) image and at least one lower-security-associated OS image. The TCP is configured to execute a multi-stage boot process that, depending on the presence of one or more valid external inputs, selects and initiates either a Type-1 TCP computing mode or a lower-assurance computing mode.

24 Claims, 2 Drawing Sheets

MULTI-LEVEL ASSURANCE TRUSTED COMPUTING PLATFORM

FIELD OF THE INVENTION

The present invention relates to the field of computing systems security, and in particular to a trusted computing platform having a multi-level assurance trusted computing platform.

BACKGROUND

A Type-1 platform is typically a dedicated computing platform that is created to provide the highest levels of security and assurance, and only provides exactly the intended functionality. In order to meet the Type 1 requirements and cost of development, such platforms have needed to limit support for additional functionality and flexibility to essential customer needs.

SUMMARY

The present Multi-Level Assurance Trusted Computing Platform (MLA TCP) is a single computing platform that can be booted in a typical high-assurance mode per Type-1 standards, or alternately can be booted in a lower-assurance mode. It is thus a cost-effective Type-1 device that can support more flexible functionality, more input/output (I/O) channels, and unsecure general computing.

DETAILED DESCRIPTION OF AN EMBODIMENT

An embodiment of a MLA TCP according to the present invention may utilize a FPGA-based high assurance trusted computing platform (HA TCP), which is a multi-layered computing system that primarily comprises a main processor (s) running an operating system (i.e. Windows, Linux, Android, etc.), and a TCP running within an FPGA (an FTCP) that controls the main processor's boot process, execution, and I/O, and executes all the highest assurance processing of the system. The HA TCP's FPGA includes a root-of-trust (FROT), which is the first part of the FTCP to boot and is created using industry standard high-assurance methods with multiple boot stages having different protections. The FPGA continues the multi-stage boot process to construct a complete TCP from its hardware elements, processing elements, memory elements, software elements, etc., per standard design practices for the required high assurance (such as power on self-test, tamper detection, redundant processing, error checking, known answer tests, signature verification, decryption, etc.). Once the FTCP has been established, it links additional FPGA secure functionality to the FROT and extends a chain of trust to the next higher level. The FTCP later chains the FROT to higher layers of the HA TCP, for use in additional security methods that may be tailored independently for a given computing system's information assurance requirements. Thus the FTCP will not only serve as the root of trust, but also contain/provide all the secure processing, secure keys, secure encryption and decryption algorithms, signature validation and creation, random number generation, remote attestation, sealed storage, binding encrypted data, etc.

Using the FROT, the FTCP performs all high-assurance processing, authenticates and decrypts all the higher layers, and allows the main processor(s) to boot into a known state. The FTCP treats the main processor(s) OS as an untrusted processing platform, and maintains hardware control over all its I/O such as through enable/disable control, power control, and/or in-line data stream processing. In-line data stream processing may include various functions from processing and inspection to encryption/decryption (preferably with the FTCP placed in-line between the main processor(s) and all memory and performing real-time encryption/decryption of all reads and writes to/from memory). The FTCP preferably is configured to perform high-assurance network processing and control and communications (including executing complex protocol stacks such as Ethernet), data processing and data flow control, and encryption/decryption to/from the main processor(s).

Figure 1:
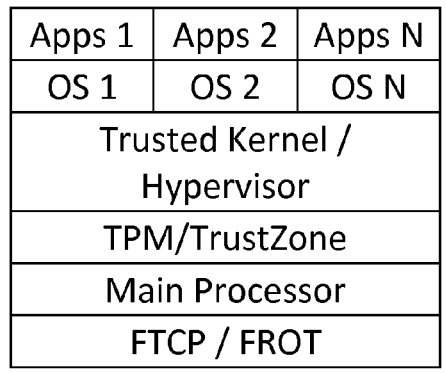
FIG. 1 is an abstract depiction of layers of security framework trust according to an embodiment of the invention.

As shown in FIG. 1, the main processor(s) OS may include multiple layers of trust adding to the assurance provided by the FTCP. For example, Trusted Platform Module (TPM) and/or TrustZone functionality can be utilized during boot to accommodate standard commercial information assurance methods and software, and a trusted kernel or hypervisor can be run on the main processor(s) for additional control of the higher-level OS and applications. TPM is a commercial secure crypto-processor that can support various security functions including cryptographic keys storage, random number generation, remote attestation, sealed storage, and binding encrypted data with an endorsement RSA key. TrustZone is a commercial secure layer that is supported by ARM processors and provides hardware-based access control enabling switching from a secure mode to a user mode; the main processor, memory devices, peripherals devices, and FPGA devices can be configured in hardware to recognize which mode the processor is in and prevent access to secure areas of memory and peripherals when in user mode, allowing secure functionality to be protected. A trusted kernel reduces the attack surface to the smallest possible security-critical functionality so that trusted code can be analyzed and verified more efficiently, and the rest of the operating system and its larger attack surface are outside the trusted code where compromise doesn't threaten security-critical functionality. A hypervisor similarly reduces attack surface but additionally creates multiple isolated virtual operating systems that must conduct all communications and hardware access through the hypervisor, which is configured to only allow certain communication paths and methods between virtual operating systems and to prevent a comprised virtual operating system or application from corrupting others. The FTCP chains its FROT to the TPM, TrustZone, trusted kernel, hypervisor, and/or other variants of higher-level security layers, monitors their functionality, and/or provides services to them. In the example of the hypervisor, the FTCP also can be integrated into the hypervisor framework and support isolated verification of hypervisor rules, detect violations, and take appropriate actions.

Figure 2:
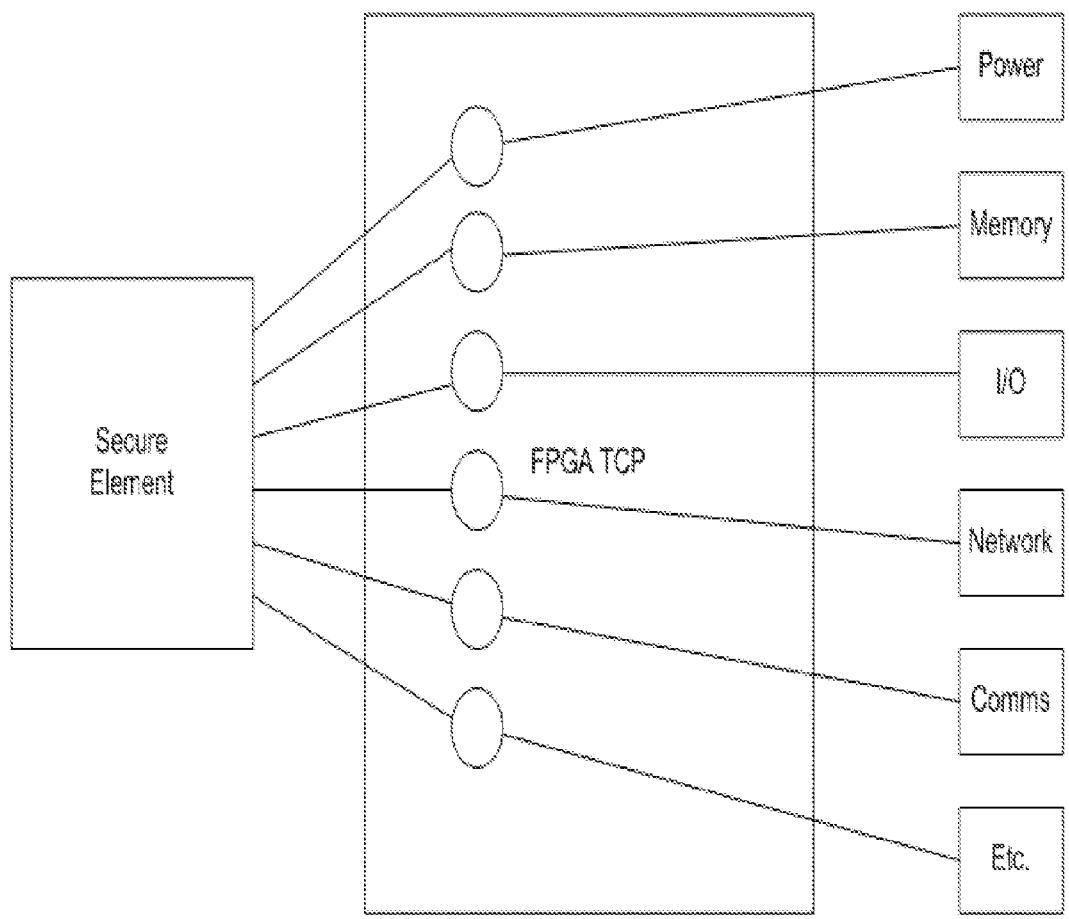
FIG. 2 is a diagram showing FTCP control on a secure module according to an embodiment of the invention.

As shown in FIG. 2, the FTCP may surround and control all the other aspects of the system that are defined as security-sensitive elements. Specifically, it can control power to the secure elements so they can be turned off or on, and it can control all the I/O of the secure elements. Thus the FTCP can control the boot process, validate the boot image, enable and disable data flow, monitor data flow, encrypt/decrypt data flow, encrypt/decrypt memory, detect and address unauthorized activity in real-time, handle certificates, route and manipulate VPN tunneling and other traffic, etc., all within the FTCP boundary (and preferably in a way that the secure element is unaware of the activity). As noted with regard to FIG. 1, the FTCP controls the booting of the main processor layer and all higher layers in the high-assurance security framework trust layers. The FTCP reads the main processor boot image from memory, validates its signature, decrypts it, verifies that it is valid and unaltered, enables the main processor to boot, and provides it the boot image. Since the FTCP is in the path between all types of memory and the main processor, the FTCP can provide real time encryption/decryption for all the read/write access to the memory as the main processor boots and executes. In addition to the boot image, the FTCP can (as part of the boot process, or as a service to the operating system) validate signature, decrypt, and verify all the sub-processes and applications prior to running them on the main processor. The FTCP validation can be chained to higher layers in the system for added security atop the higher layers' own validation methods. The FTCP can also monitor the main processor activity for anomalies and take appropriate actions when detected. For example, when the main processor is running a secure software routine wherein only certain memory ranges should be accessed and no network communications should occur, if the FTCP detects activity that violates these rules it can (among other things) block all data from leaving the main processor and perform a secure reboot into a known state. The main processor may also have physically-integrated secure boot protections such as special circuits and fuses used by special circuitry in the processor to signature-check and support decryption of the boot image prior to allowing the processor to boot from the code. The FTCP can work with such additional boot methods using the FROT.

A MLA TCP utilizes a HA TCP as described above, but also provides one or more other security levels of operation. Upon power-up, the MLA TCP device boots into either HA TCP mode or else one of the other modes of security functionality, depending on an external input(s) such as a check for the presence of a valid Crypto Ignition Key (CIK) and/or other authentication inputs.

Figure 3:
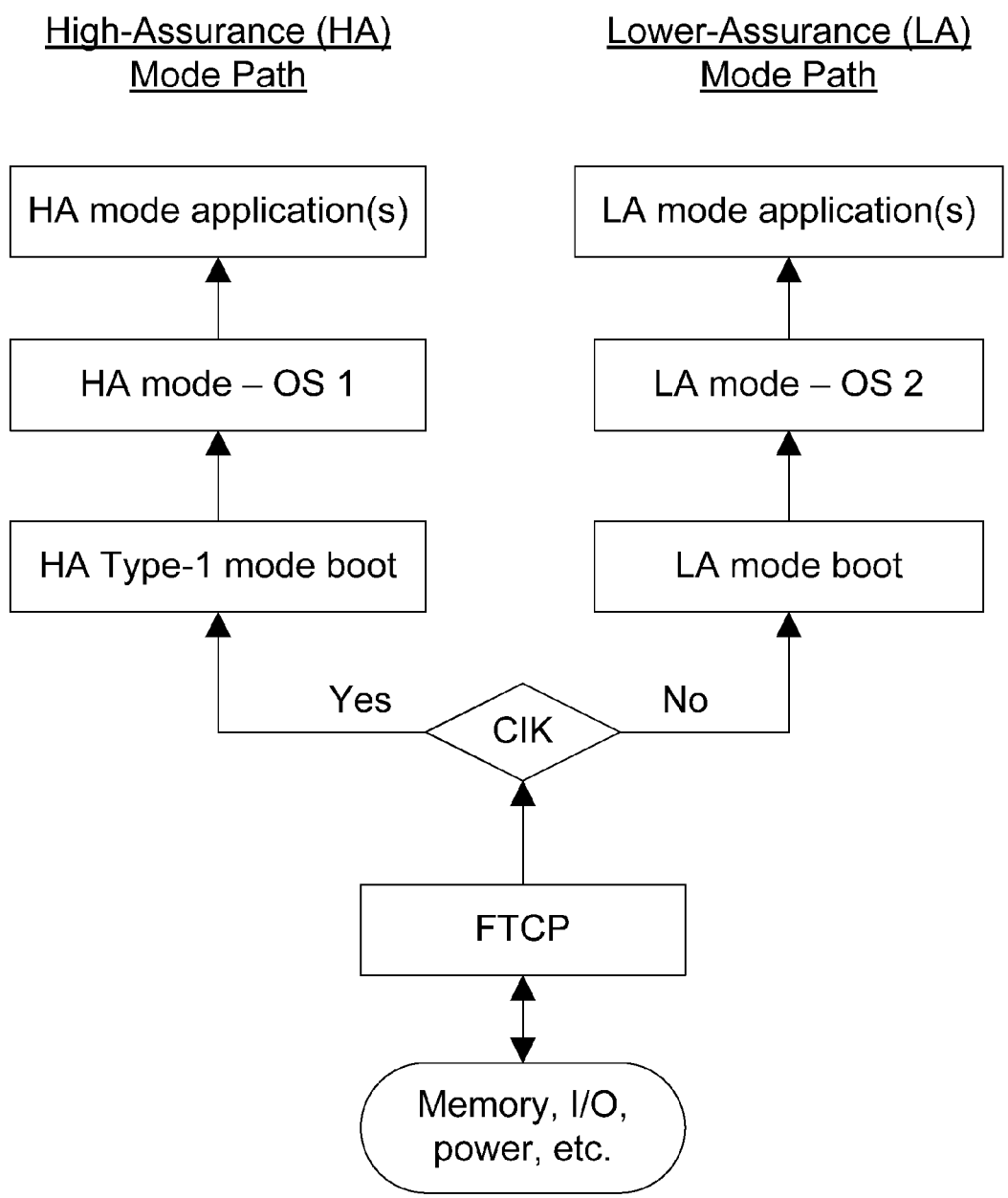
FIG. 3 is a flowchart depicting an embodiment of the invention having two modes, the selection of which depends on the presence of a valid external (CIK) device.

Turning to FIG. 3, a basic operation flowchart for a two-mode example depending on the presence of a valid CIK device is shown. (An associated password requirement, not shown, is also preferable). The left branch or path (high-assurance (HA) mode) is followed if the CIK is present; otherwise the right branch or path (lower-assurance (LA) mode) is followed. (Alternative embodiments could be utilize additional modes by requiring corresponding additional inputs in the boot sequence). If the CIK device is present, the MLA TCP initiates the HA mode boot process, loading and configuring the FPGA with a HA mode configuration (the stored image of which is isolated and encrypted) that creates a FTCP through the high-assurance multi-stage boot process utilizing the FROT as described above. If the HA mode boot process is successfully completed, the MLA TCP initiates HA mode processing functionality and boots the main processor with a HA mode operating system (OS 1) having functionality and access that is restricted and controlled by the FTCP per Type-1 requirements and is isolated from all LA mode functionality, applications (i.e., as seen in FIG. 3, it can access HA mode application(s) but not LA mode application(s)), files systems, and devices. In this mode, the MLA TCP device is a Type-1 HA TCP that utilizes the FTCP to perform all secure operations, I/O, power control, access to devices, process cryptograph functions, and protect keys.

If the HA mode boot process is either not entered or not completed, the MLA TCP enters the less-secure LA mode boot process, loading and configuring the FPGA with a LA mode configuration. (The MLA TCP may be configured to require some authentication such as a password, however, to allow even LA mode boot). Assuming LA mode boot successfully completes, the MLA TCP initiates LA mode processing functionality and boots the main processor with a LA mode operating system (OS 2) that in conjunction with the FTCP and FROT prevents any access to HA mode functionality and areas. In this mode, the MLA TCP device is a less secure, general-use, open computing device that may allow connection to additional interfaces, devices, and communication channels, and may support additional functionality (e.g., installing software, accessing the internet, executing general purpose applications, etc.). Thus the MLA TCP is a single computing platform that is Type-1-capable but has a second mode (and optionally N additional modes by chaining the FROT into additional higher layer methods/modes) that supports higher-risk functions while remaining securely isolated from functionality, applications, files systems, and devices that need to be secure.

What is claimed is:

1. A multi-mode Trusted Computing Platform (TCP), comprising:
   a. a Field Programmable Gate Array (FPGA) device that includes a Type-1-compliant root of trust (ROT);
   b. memory containing a Type-1 security boot image and at least one lower-security boot image than the Type-1 security boot image; and
   c. memory containing a Type-1-associated operating system (OS) image and at least one lower-security-associated OS image than the Type-1-associated OS image;
   wherein the TCP is configured to execute a multi-stage boot process that, depending on presence of one or more valid external inputs, selects and initiates either a Type-1 TCP computing mode or a lower-assurance computing mode than the Type-1 TCP computing mode;
   wherein the TCP is configured such that a set of input/output (I/O) devices and applications with which the TCP can interact depends upon the computing mode selected and initiated by the TCP; and
   wherein the TCP is configured to have functionality and access that, when in Type-1 TCP computing mode, is restricted and controlled by the FPGA-based TCP (FTCP) per Type-1 protocol and is isolated from all non-Type-1 TCP computing mode functionality, applications, files systems, and devices.

2. The TCP of claim 1, wherein the one or more valid external inputs include a portable device.

3. The TCP of claim 2, wherein the portable device is a Crypto Ignition Key (CIK) device, Universal Serial Bus (USB) token, or Radio Frequency Identification (RFID) device.

4. The TCP of claim 1, wherein the TCP is configured to be unable to access Type-1 TCP functionality and areas when in non-Type-1 TCP computing mode.

5. The TCP of claim 1, wherein the TCP is configured to check for the presence of the one or more valid external inputs.

6. The TCP of claim 5, wherein the FPGA is configured to boot a Type-1 compliant FPGA-based TCP (FTCP) upon a successful check for the presence of the one or more valid external inputs corresponding to Type-1 TCP computing mode.

7. The TCP of claim 6, wherein the FPGA is configured to initiate booting of the FTCP with booting of a FPGA-based root of trust (FROT).

8. The TCP of claim 7, further comprising a main processor, wherein the FTCP is configured to link the FROT to higher-level security means implemented on the main processor.

9. The TCP of claim 8, wherein the higher-level security means comprise Trusted Platform Module or TrustZone.

10. The TCP of claim 8, wherein the higher-level security means comprise a trusted kernel.

11. The TCP of claim 8, wherein the higher-level security means comprise a hypervisor.

12. The TCP of claim 11, wherein the FTCP is integrated into the hypervisor.

13. The TCP of claim 1, wherein the FTCP is configured to surround and control all security-sensitive system elements.

14. The TCP of claim 13, further comprising a main processor, wherein the FTCP is configured to treat the main processor as untrusted and to maintain hardware control over the main processor.

15. The TCP of claim 14, wherein the FTCP is configured to perform hardware control that includes enable/disable control, power control, and/or data stream processing.

16. The TCP of claim 14, wherein the FTCP is configured to perform hardware control that includes in-line data stream processing comprising processing, inspection, and encryption.

17. The TCP of claim 14, wherein the FTCP is configured to process complex protocol stacks and perform authorization and control of data traffic.

18. The TCP of claim 14, wherein the FTCP is configured to perform hardware control that includes encrypting and decrypting all main processor read/write memory access.

19. The TCP of claim 14, wherein the FTCP is configured to control the main processor boot process.

20. The TCP of claim 19, wherein the FTCP is configured to read, validate, decrypt, verify, and load onto the main processor a Type-1-associated OS image.

21. The TCP of claim 14, wherein the FTCP is configured to read, validate, decrypt, and verify all main processor sub-processes and applications.

22. The TCP of claim 21, wherein the FTCP is configured to link validation to higher-level security means implemented on the main processor.

23. The TCP of claim 14, wherein the FTCP is configured to monitor main processor activity for anomalies.

24. The TCP of claim 14, wherein the main processor includes one or more physically-integrated secure boot protections.

* * * * *